March 12, 1940. H. McDOWELL, JR Re. 21,389

SOUND RECORDING

Original Filed Nov. 8, 1930 2 Sheets-Sheet 1

INVENTOR
HUGH McDOWELL JR.
BY H. S. Grover
ATTORNEY

March 12, 1940. H. McDOWELL, JR Re. 21,389

SOUND RECORDING

Original Filed Nov. 8, 1930 2 Sheets-Sheet 2

INVENTOR
HUGH McDOWELL JR.
BY N. S. Sweet
ATTORNEY

Reissued Mar. 12, 1940

Re. 21,389

UNITED STATES PATENT OFFICE 21,389

SOUND RECORDING

Hugh McDowell, Jr., Los Angeles, Calif., assignor to Radio-Keith-Orpheum Corporation, a corporation of Maryland Original No. 1,855,197, dated April 26, 1932, Serial No. 494,215, November 8, 1930. Application for reissue March 12, 1938, Serial No. 195,569

7 Claims. (Cl. 179—100.3)

The present invention relates to sound recording and sound reproducing systems and methods, and has particular relation to such systems and methods wherein the sound records are in the form of photographic variable area or variable density strips upon linear films, such as motion picture films, etc. Sound film recording and reproducing processes must meet three essential requirements; namely, the quality of the sound reproduced must be good, the range of sound from soft to loud must be considerable, and there must be a diminution of ground noise when the volume of sound reproduced is low. In the present standard methods of recording, the first requirement is fulfilled. The second requirement is partially fulfilled, although the range of volume obtainable is not as great as could be desired. The third requirement is not met, due to what is known as "ground noise." This, as will be explained more in detail immediately hereafter, is the chief factor in limiting the range obtainable in fulfillment of the second requirement set forth above.

When a sound record of the type described is moved between a fixed light source and a photosensitive cell, dust, oil, and dirt adhering to the transparent variations thereof, as well as the inherent granular structure of the film, give rise to a fluctuation in the intensity of light reaching the photoelectric cell and a subsequent production of of an electric current variation affecting the reproducers and causing them to produce what is commonly known as "ground noise."

In accordance with the usual process, the sound is originally recorded upon speed motion picture film, the grain of which is necessarily large. The portions of the negative record which are blackened are not entirely blackened as there are interstices between the large grains of the emulsion. When the negative record thus produced is used to print the positive, some of the relatively smaller emulsion grains of the normally clear portions thereof become exposed through the transparent interstices in the supposedly opaque portions of the negative. This granular effect, as above noted, adds to the effect of dirt, scratches, and oil, in producing ground noise in reproduction. This, as a contributory cause, however, may be much less than the superficial dust and dirt, although the dust and dirt may be, of course, eliminated by proper handling, whereas the granular structure of the clear portions cannot be prevented.

The intensity of the ground tone is substantially constant throughout any particuar portion of the film since the average transparency thereof is relatively constant. However, it is much more noticeable and unpleasant during the periods when no sounds or faint sounds are being intentionally reproduced.

It is obvious, therefore, that with the standard method of recording, the sound volume reaching the film recorder must at all times be adequate to overcome the noise factor which, as above noted, remains constant. This produces a limitation in the range of volume which can be obtained with a given film.

Accordingly, an object of my invention is to provide a sound recording method whereby a photographic sound record may be reproduced without an objectionable amount of ground noise.

A further object of my invention is to produce a recording system which will produce a record which may be reproduced in the ordinary sound reproducer and still eliminate the ground noise to a considerable extent.

It is a still further object of my invention to produce a recording process which will result in a record which may be reproduced with the ordinary sound reproducing equipment and yet eliminate the ground noise to a considerable extent.

It is another object of my invention to produce a recording system which will result in a record which may be reproduced in the ordinary photophonographic sound reproducer and permit full volume range to be obtained.

It is yet another object of my invention to produce a process which will result in a record which may be reproduced photophonographically and permit full volume range.

These and further objects of my invention will become apparent from the following specification taken in connection with the appended drawings.

In accomplishing the objects of my invention, I eliminate the greater part of the clear portion of the film record except in so far as it is necessary to permit full modulation at a given sound intensity. Thus it is possible to allow the modulation to fall to its natural minimum and rise to its natural maximum, for with the clear portions of the film practically eliminated the ratio of ground noise to sound remains constant, instead of changing in inverse proportion to the average sound intensity.

With the standard method of sound recording, the film range, for instance, from minimum to maximum is approximately 20 TU's; while in the antiground noise of my invention, the film range may be made approximately from 35 to 40 TU's.

In carrying out my invention the usual variable area sound recorder is utilized. This recorder, for instance, may be a galvanometer type utilizing a vibrating mirror actuated by the voice currents. Connected with the voice input is an amplifier and a detector for amplifying and detecting the voice currents respectively. The rectified voice currents are then utilized to operate a shutter placed in the path of the vibrating light beam for the purpose of limiting the amount of light falling upon the negative sound record to that which is necessary to permit the full fluctuation or modulation of the recording light. The shutter will move in proportion to the D. C. impulses representative of the rectified voice current, and will admit light only to the extent required by the peak modulation reaching the film at any instant. When no modulation occurs, the shutter is adjusted to admit light to the film to the extent of approximately five thousandths of an inch in width as against the usual thirty-five thousandths width for the normal recording system. It is seen by this that there will therefore remain about ten per cent of the clear portion of the film that formerly existed.

The amount of light reaching the photo cell of the projector, therefore, operated by a positive produced by the negative produced in accordance with my invention, will be greatly reduced when there is no modulation, and the variation in light intensity due to dirt, scratches and grain structure, will be correspondingly decreased. This in turn greatly reduces the amount of ground noise.

In other words, the ground noise will be reduced with the volume, and will maintain a constant ratio relative thereto. This will permit rather slight sounds to be recorded and reproduced, and will permit the reproducer amplifier to remain set for the soft portions of the accompaniment instead of having to be cut down to prevent whisper being reproduced as a shout.

Having thus briefly described my invention, attention is invited to the accompanying drawings, in which.

Figure 1:
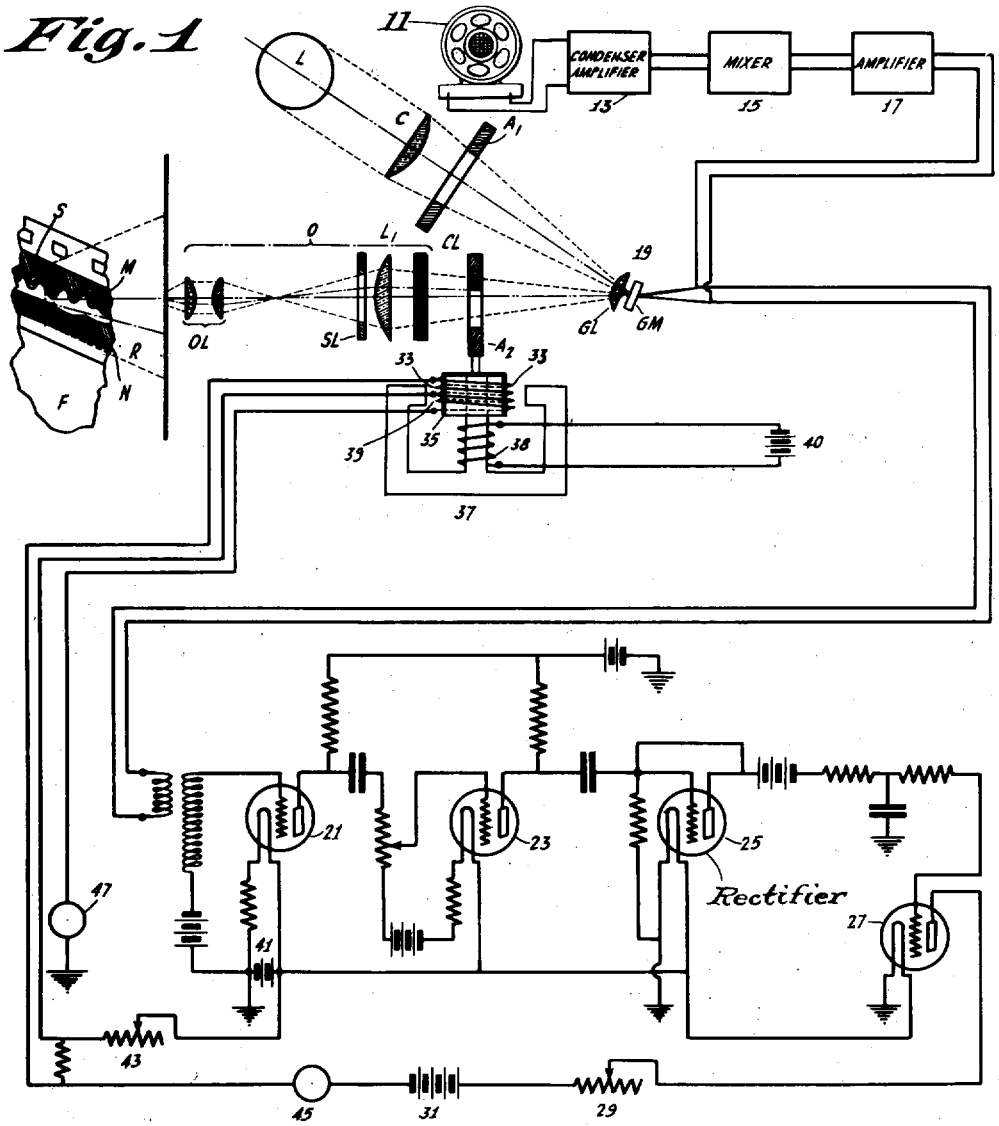
Fig. 1 is a schematic diagram illustrating the recording of sound in accordance with my invention, and electrical circuits for accomplishing this process.

Particular attention is now invited to Fig. 1. Condenser 11 is the condenser of a condenser microphone which serves, by means of the condenser amplifier 13, to produce a current of varying intensity representative of the strength of voice oscillations operating upon the condenser microphone 11. A plurality of condenser microphone and their corresponding modulators may be utilized in which case the mixer 15 serves to combine the currents picked by the various microphones in the proper proportion. The currents as thus combined are supplied by the mixer 15 to the amplifier 17.

The current produced by the amplifier 17 is used to actuate the vibrating oscillograph mirror 19. The mirror 19 is the oscillograph mirror of the usual variable area sound recording system, schematically illustrated in this figure. The light from source L is condensed by means of the condenser lens C, passed through the aperture $A_1$, through galvanometer lens GL and is reflected by the oscillograph mirror 19 again through GL, through the usual optical system O comprising cylindrical lens CL and lens $L_1$ which serve to focus the light in the form of a narrow slit upon the narrow slot SL, the image of which slot is focussed in the form of a narrow slit of light S upon the sound portion R of the film F. The film F is moved in such a manner that the narrow slit of light S falls in a direction transverse to the motion of said film.

The area of the film exposed to the action of the light L is controlled by means of the oscillograph mirror 19, and would in itself produce the usual variable area record. However, there is interposed between the oscillograph mirror 19 and the lens CL an additional apertured shutter $A_2$. The movement of this shutter serves to cut down the width of the sound track in the opposite direction from the screening resulting by the combination of the aperture $A_1$ and the oscillograph mirror 19. Thus, referring particularly to the film F, the action of shutter $A_2$ serves to produce the shaded portion N of the record R; whereas the conjoint action of aperture $A_1$ and oscillograph mirror 19 serve to produce the shaded portion M of record R, the latter of course being the usual shading produced by the ordinary variable area sound recording process. The negative film produced by this process will be transparent in the portions indicated by the shadings in Fig. 1, the clear portions having been exposed to the light, the negative therefore upon development will appear opaque at such portions, and clear at the portions which were shaded in the recording by the aperture $A_1$ and mirror 19 or shutter $A_2$.

Figure 2:
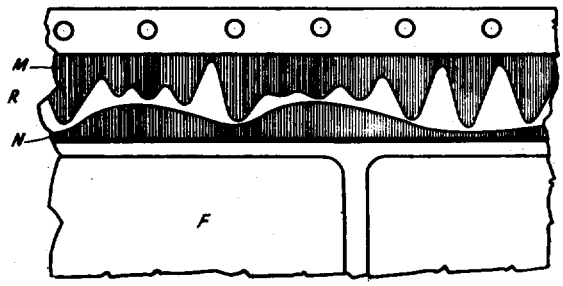
Fig. 2 represents a portion of a sound record as produced in accordance with my process.

In printing from the negative thus produced, a positive in the nature of the film represented in Fig. 2, to which attention is now invited, is produced. In this figure, the film F bears a sound strip record R composed of the shaded portions M representative of the voice or other sound waves recorded, and the shaded portion record N which accomplishes the purpose of my invention in reducing the amount of the clear portions of said positive to the minimum required to give the full light fluctuations when the positive record is used to control the light falling upon a photosensitive device.

Connected with the circuit supplying the vibrating mirror 19 is a two stage amplifier, comprising thermionic devices 21 and 23. The output of this amplifier is supplied to the thermionic rectifier 25. The audio current thus rectified is passed to a D. C. amplifier 27 of thermionic devices in parallel. For the purpose of convenience, a single device 27 has been illustrated. It is understood, however, that for the single device 27 there may be substituted any desirable number of similar devices, arranged in parallel, which latter is the form in which I have operated my invention.

The rectified and amplified D. C. impulses are supplied through resistance 29, battery 31 and through the voice coil 35 of the electrodynamic device 37 to ground. The field 38 of device 37 is supplied by the battery or equivalent D. C. potential 40. Coil 35 is divided into two portions 33 and 39 both of which portions serve, when current is flowing through the amplifier 27, to move the coil in one direction. The center tap connecting the two coils 33 and 39 is connected through the high potential side of the filament battery 41 and through a variable resistor 43, the said circuits being so proportioned that when no current is flowing through the amplifier 27, the current flowing through the portion 39 of coil 35 will be sufficient to move the coil 35 in the opposite direction. To the moving coil 35 of this device, is connected the apertured shutter $A_2$, described above.

Thus, the shutter moves in proportion to the amount of input of the amplifier circuit, moving outward under the pressure of the rectified current of the voice coils to accommodate the peaks of the modulation on the film and moving backward, when the modulation has ceased, under the pressure of portion 39 of the coil 35. The vibration of the apertured shutter $A_2$ is in exact accordance with the D. C. impulses of the rectifier 26 and, therefore, it passes light only to the extent required to permit the peak modulation reaching the film at any given instant. When no modulation occurs, the shutter is adjusted to admit a beam of light of a width of approximately five thousandths of an inch to the recording film.

A milliammeter 45 is inserted in lead to portion 33 of voice coil 35 for indicating the variations of current in this system. A similar milliammeter 47 is inserted in the lead from ground to portion 39 of voice coil 35 for a similar purpose.

For orchestra recording, the recording level may be determined by trying out the operation of the recorder on the highest fortissimo of the orchestra and setting the amplification so that no over-shooting occurs. Then the amplification having once been adjusted, the volume of recording is controlled naturally by the change of volume produced by the orchestra.

Figure 3:
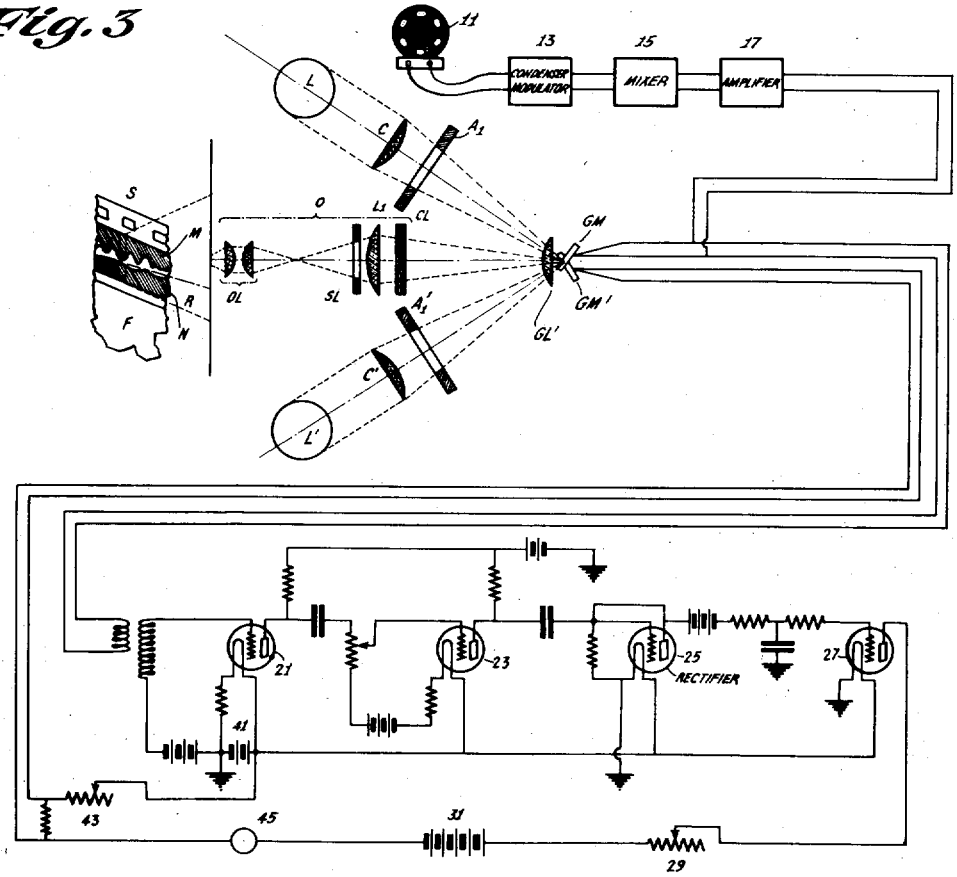
Figs. 3 and 4 illustrate modified embodiments of my invention.

An alternative recording arrangement may be provided in which a second mirror GM′ is substituted for the shutter $A_2$ of the above described and illustrated arrangement. This second mirror may be operated by the usual galvanometer coils controlled by the output of the amplifier 27 and controls the placement of the image of a second light source having its own condenser lens C′ and aperture plate $A_1$′. This image is thrown upon the film F through the same optical system O as shown in Fig. 3.

Figure 4:
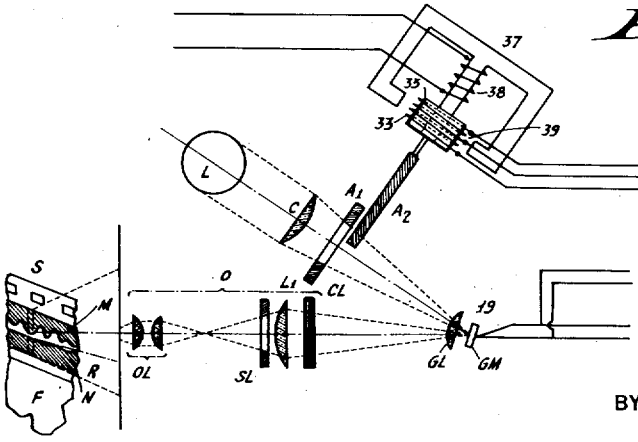

A second alternative device may be arranged by controlling the size of aperture plate A, as shown in Fig. 1 and described above, by means of a voice coil 33′ similar to that shown. This is effected by placing an aperture shutter $A_2$′ adjacent the aperture $A_1$ as shown in Fig. 4.

It is obvious that for the electrodynamic shutter motor 37 shown and described, an electrostatic motor or other secondary mover may be substituted.

In the event of using a variable density system, the system illustrated may be used in which case the shutter aperture $A_2$ would merely vary the width of the sound track recorded. A V-shaped aperture shutter might be substituted to vary the width of the track in order to increase the variation over that obtainable with the shutter illustrated.

Having thus described my invention, attention is invited to the fact that I am not to be limited by the specific embodiment shown and described for the purpose of illustration only, but by the actual scope of my invention as set forth and determined in the accompanying claims.

I claim as my invention:

1. In combination, means adapted to continuously expose a light sensitive surface to the action of a beam of light, a galvanometer responsive to sound waves to be recorded for varying the application of said beam of light to said surface in accordance with said sound waves, means including a rectifier for deriving from said sound waves a direct current corresponding to the envelope of said waves, and a shutter responsive to said direct current for varying the application of said beam of light in accordance with said envelope.

2. In combination, means adapted to continuously expose a light sensitive surface to the action of a beam of light, a sound controlled galvanometer for influencing said light, means for deriving a direct current proportional to the crest amplitude of said sound, and a shutter whereby the direct current may be independently utilized to further influence said light.

3. The method of making photographic sound records adapted to produce a minimum amount of ground noise upon reproduction which comprises exposing a sensitive film to a light beam, varying one side of said light beam in accordance with the wave form of the sound being recorded, and varying the other side of the said beam in accordance with a rectified component of said wave.

4. Apparatus for recording sound on a moving light recording member comprising means including a galvanometer responsive to electrical waves corresponding to sound waves for exposing said member, means including a shutter for varying the exposure thus produced, and means connected in circuit with said shutter for rectifying and damping said electrical waves.

5. The method of making variable width photographic sound records in which the clear area varies in accordance with the volume of the sound being recorded, which comprises, exposing a sensitive film to a single light beam, vibrating one edge of the beam laterally of the film in accordance with the sound wave being recorded, and simultaneously producing a lateral displacement of the other edge on the beam in accordance with a rectified component of said wave.

6. Apparatus for recording sound on a moving light sensitive member which comprises shutter means for varying the limits of the light falling upon said sensitive member in accordance with sound impulses, said means including a coil normally excited to move said means in one direction, and a second coil excited by the envelope of said sound impulses to move said means in the other direction.

7. Apparatus for recording sound on a moving light sensitive member which comprises a light source, an aperture, a galvanometer for reflecting the light passed through said aperture, an optical system for focussing the light thus deflected upon a moving light sensitive member in the form of a narrow slit transverse thereof, means for actuating said galvanometer in accordance with sounds in such a manner that the extent of illumination of said light sensitive member by said beam of light will be defined by one edge of said aperture, and shutter means for limiting the illumination of said light sensitive member in the other direction in accordance with the average sound intensity, said last mentioned means including a coil for normally moving said shutter means in one direction, and a second coil actuated in accordance with said sound intensity to move said shutter means in the opposite direction.

HUGH McDOWELL, Jr.